United States Patent
Herbstreit

(10) Patent No.: US 8,838,420 B2
(45) Date of Patent: Sep. 16, 2014

(54) MODEL MANAGEMENT FOR COMPUTER AIDED DESIGN SYSTEMS

(75) Inventor: Michael Edward Herbstreit, St. Louis, MO (US)

(73) Assignee: The Boeing Company, Chicago, IL (US)

(*) Notice: Subject to any disclaimer, the term of this patent is extended or adjusted under 35 U.S.C. 154(b) by 702 days.

(21) Appl. No.: 13/076,128

(22) Filed: Mar. 30, 2011

(65) Prior Publication Data

US 2012/0253763 A1 Oct. 4, 2012

(51) Int. Cl.
G06F 17/10 (2006.01)
G06F 7/60 (2006.01)
G06F 17/50 (2006.01)

(52) U.S. Cl.
CPC ........ G06F 17/5095 (2013.01); *G06F 2217/34* (2013.01)
USPC .......................................................... 703/2

(58) Field of Classification Search
USPC .......................................................... 703/2
See application file for complete search history.

(56) References Cited

U.S. PATENT DOCUMENTS

| 5,646,862 | A | 7/1997 | Jolliffe et al. | |
|---|---|---|---|---|
| 6,766,331 | B2* | 7/2004 | Shema et al. | 1/1 |
| 7,321,364 | B2 | 1/2008 | Manson | |
| 7,444,269 | B2 | 10/2008 | Drumheller | |
| 7,698,016 | B2 | 4/2010 | Jayaram et al. | |
| 8,548,774 | B2* | 10/2013 | McLuckie | 703/1 |
| 2002/0184246 | A1* | 12/2002 | Shkolnik | 707/203 |
| 2003/0063104 | A1* | 4/2003 | Shiroyama et al. | 345/619 |
| 2003/0101029 | A1 | 5/2003 | Drumheller | |
| 2003/0149502 | A1 | 8/2003 | Rebello et al. | |
| 2003/0204823 | A1 | 10/2003 | Armstrong et al. | |
| 2005/0071135 | A1* | 3/2005 | Vredenburgh et al. | 703/1 |
| 2006/0212276 | A1* | 9/2006 | Drumheller | 703/1 |
| 2007/0186149 | A1* | 8/2007 | Ghantous et al. | 715/502 |
| 2008/0275677 | A1* | 11/2008 | Landon | 703/2 |
| 2010/0082303 | A1 | 4/2010 | Rousseau et al. | |

FOREIGN PATENT DOCUMENTS

WO WO2005006220 1/2005

OTHER PUBLICATIONS

Richard H. Bossi, Gary E, Georgeson, "Computed Tomography Analysis of Castings" Boeing Aerospace & Electronics, Jan. 1992, 38 pages.*

PCT search report dated May 23, 2012 regarding PCT/US2012/026158, filed Feb. 22, 2012, applicant The Boeing Company, 9 Pages.

* cited by examiner

*Primary Examiner* — Dwin M Craig
(74) *Attorney, Agent, or Firm* — Yee & Associates, P.C.

(57) ABSTRACT

A method and apparatus for generating data for analysis from a model for a system. Components in the system are identified using the model for the system. Attributes for the components are identified using the model and a repository having performance information. Data is generated using the attributes. The data is configured for use by a particular analysis application.

20 Claims, 12 Drawing Sheets

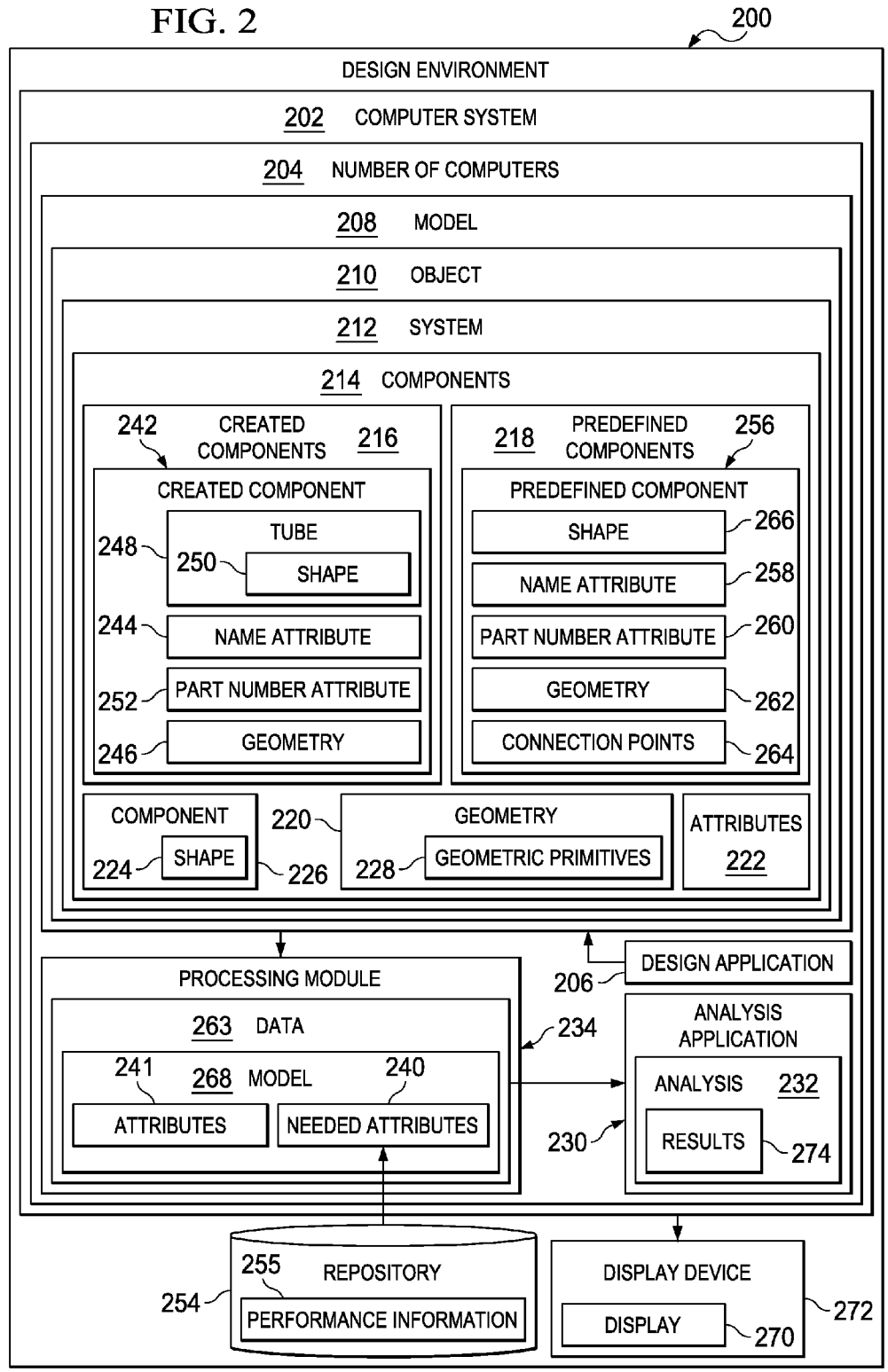

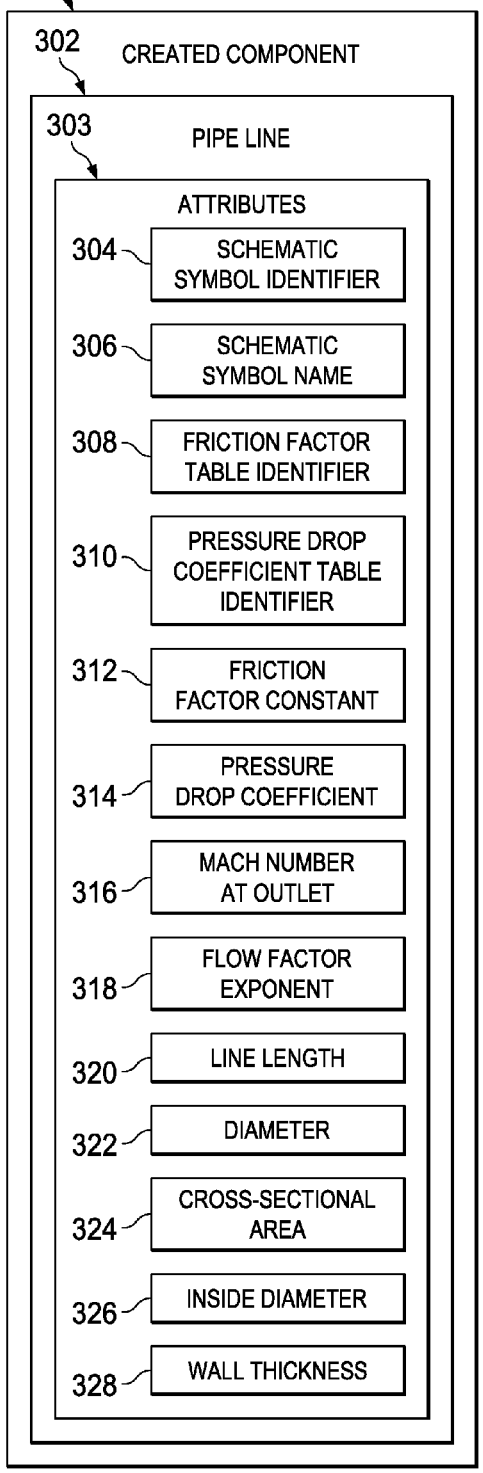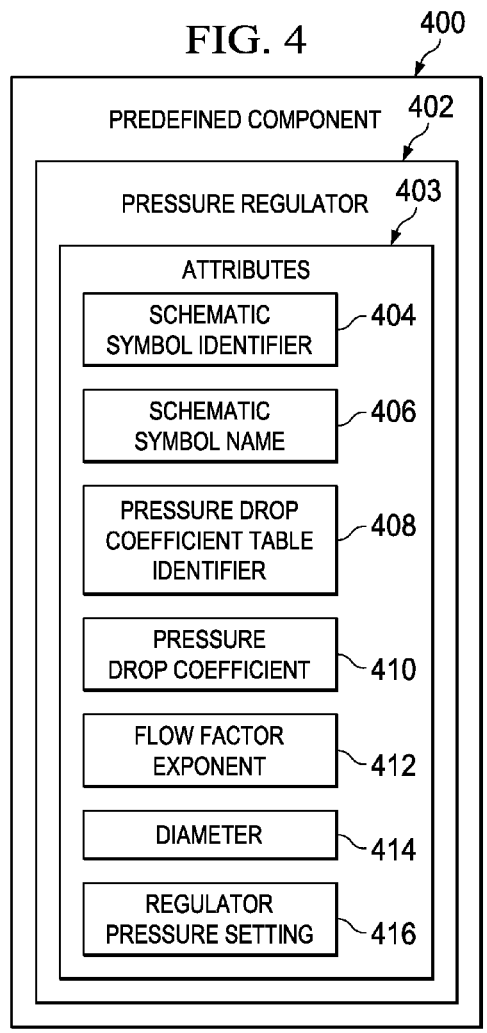

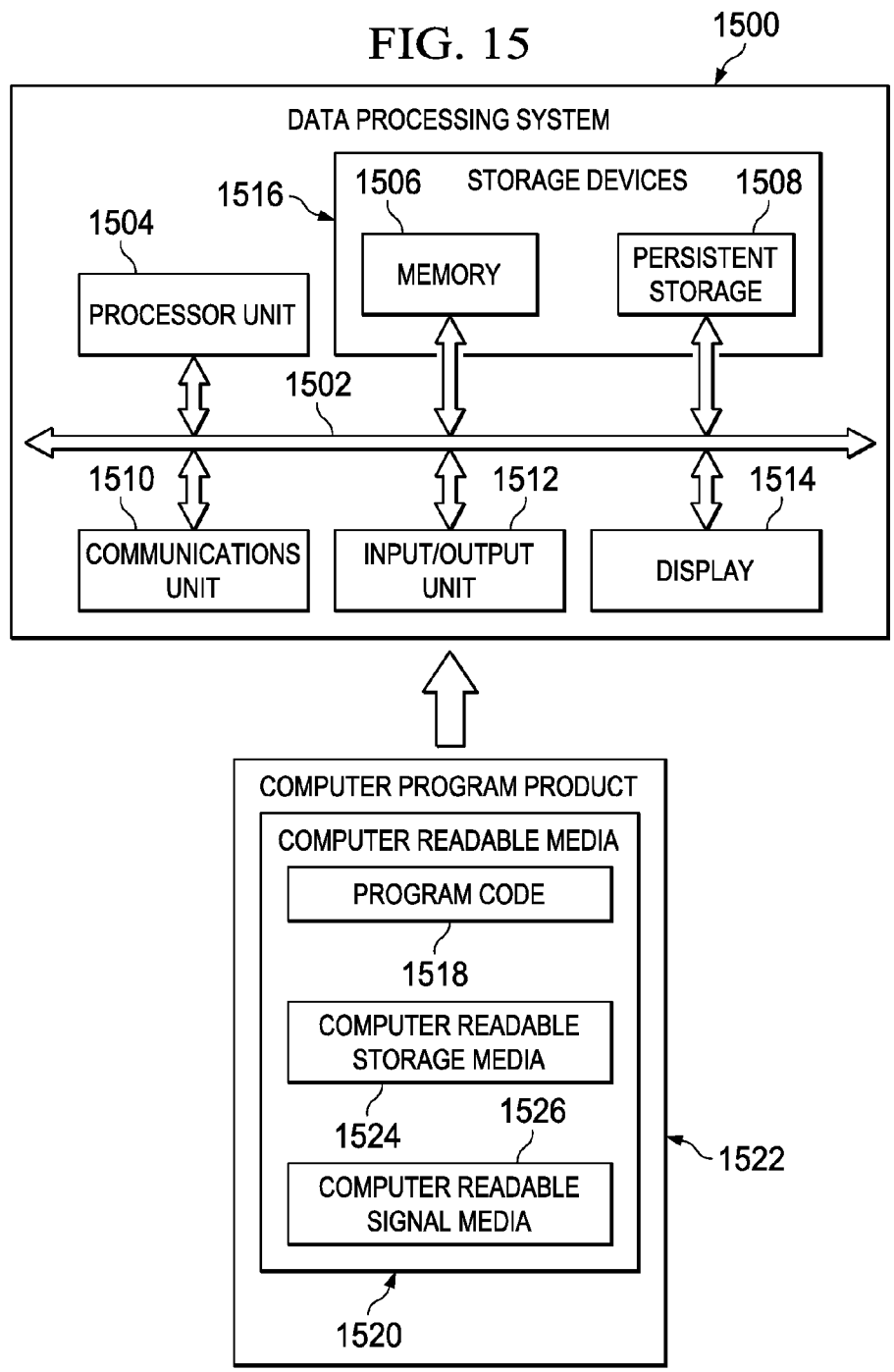

MODEL MANAGEMENT FOR COMPUTER AIDED DESIGN SYSTEMS

BACKGROUND INFORMATION

1. Field

The present disclosure relates generally to models of objects and, in particular, to models of systems in objects, such as aircraft. Still more particularly, the present disclosure relates to a method and apparatus for processing the model of a system in an aircraft.

2. Background

Modern aircraft have many different types of systems. For example, an aircraft may have a hydraulic system, an environmental control system, an electrical system, a computer system, and/or other types of systems. The different systems in an aircraft have different components and interconnections between the components. For example, a hydraulic system may have pumps and valves that are connected to each other by tubes.

In designing these and other types of systems, applications are used to generate models of these systems and/or the aircraft having these systems. For example, applications running on computers may be used to design objects, such as aircraft, and/or assemblies, systems, and parts of the objects. In particular, models may be generated for these different types of objects. Software, such as computer aided design (CAD) software, may be used to create these models. For example, a computer aided design software package may include software to create a model for a hydraulic system for an aircraft.

The models generated using these types of applications are representations of the objects. These representations may be two-dimensional and/or three-dimensional representations of the objects. Further, information may be included in the models. This information may take the form of metadata. Metadata may be defined as data about data. In other words, metadata is data that provides information about one or more aspects of the data with which the metadata is associated. For example, metadata for a model may include information about various aspects of the model.

In particular, metadata may provide information about the different components that make up the object in the model. This information may be used to manufacture the object from the model. For example, the metadata may include a part identifier, a type of material, a dimension, a location, and/or other suitable types of information for the components making up the object in the model and the object.

These types of models may be used to manufacture the objects or parts for the objects that are in the model. Oftentimes, however, analysis of the objects may be performed before the object is actually manufactured. The analysis may be performed using different types of software.

For example, system analysis software may be used to model fluid flow in an object, such as a hydraulic system for an aircraft. As another example, a system analysis program also may be used to predict hydraulic pressure surges to an object in the form of a landing gear system for an aircraft.

The results of the analysis may be used to verify that desired characteristics are present for an object. The results also may be used to make changes to the model to obtain the desired characteristics.

Moving information from a model to an analysis program is often more time consuming and tedious than desired. When more time and effort is used to move the information from a model to the analysis program, the time needed to complete design and production of an object may increase. The increase in time may result in more expense and undesired delays in producing the object.

Therefore, it would be advantageous to have a method and apparatus that takes into account at least some of the issues discussed above, as well as possibly other issues.

SUMMARY

In one advantageous embodiment, a method is provided for generating data for analysis from a model for a system. Components in the system are identified using the model for the system. Attributes for the components are identified using the model and a repository having performance information. Data is generated using the attributes. The data is configured for use by a particular analysis application.

In another advantageous embodiment, a method for analyzing a system is provided. Components are connected to each other in an arrangement for the system. Attributes associated with each of the components are retrieved. The attributes include information about a performance of each of the components. The performance of the components in the system is analyzed using the attributes and the connected arrangement of the system.

In yet another advantageous embodiment, a computer program product comprises a computer readable storage media and first program code, second program code, and third program code stored on the computer readable storage media. The first program code is for identifying components in a system using a model for the system. The second program code is for identifying attributes for the components using the model and a repository having performance information. The third program code is for generating data using the attributes, wherein the data is configured for use by a particular analysis application.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 2 is an illustration of a design environment in accordance with an advantageous embodiment;

FIG. 3 is an illustration of attributes for a created component in accordance with an advantageous embodiment;

FIG. 4 is an illustration of attributes for a predefined component in accordance with an advantageous embodiment;

FIG. 15 is an illustration of a data processing system in accordance with an advantageous embodiment.

DETAILED DESCRIPTION

The different advantageous embodiments recognize and take into account a number of different considerations. For example, the different advantageous embodiments recognize and take into account that the accuracy of an analysis of a model depends on the model being analyzed matching, as closely as possible, the model generated by the design application. The different advantageous embodiments recognize and take into account that one manner in which accuracy may be ensured is for an operator to review the model generated by the design application and obtain the information needed to recreate a model for the analysis application.

The different advantageous embodiments recognize and take into account that this type of process may be more time consuming that desired. Further, the different advantageous embodiments also recognize and take into account that errors in entry of data or different perspectives on what data is needed for an analysis model may be present.

Thus, the different advantageous embodiments provide a method and apparatus for processing models. In the different advantageous embodiments, the processing of the models may be performed in a manner to generate data containing information for analysis. This data may take the form of a model that is specifically designed or configured to be run by a particular analysis application.

For example, in one advantageous embodiment, a method is provided for processing a model for a system. Components in the system are identified using the model for the system. Attributes for the components are identified using the model and a repository having performance information. Data is generated using the attributes. The data is configured for use by a particular analysis application.

Figure 1:
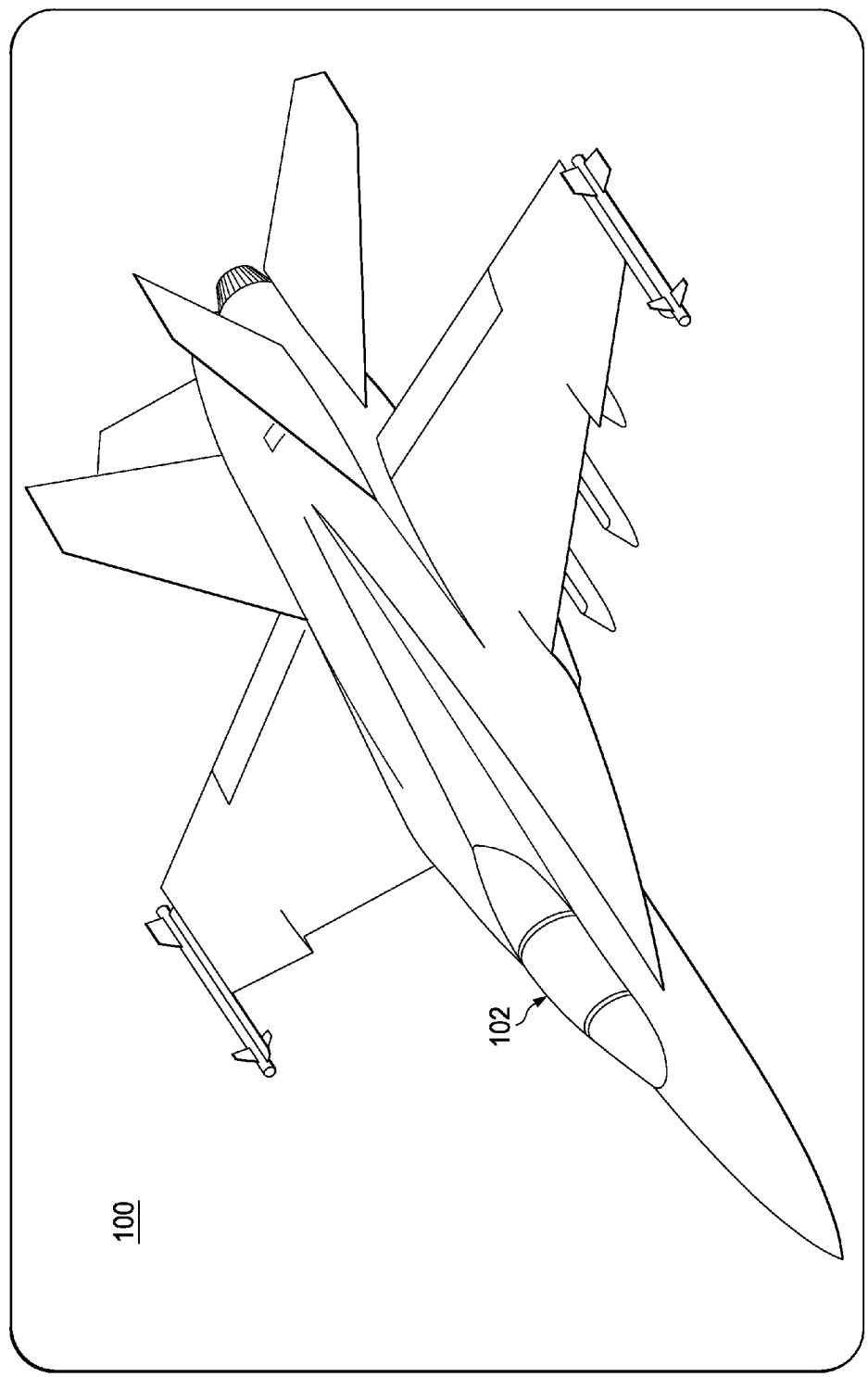
FIG. 1 is an illustration of a display of an aircraft in accordance with an advantageous embodiment.

With reference now to FIG. 1, an illustration of a display of an aircraft is depicted in accordance with an advantageous embodiment. In these illustrative examples, a display 100 of an aircraft 102 is a presentation of a model for the aircraft 102. In particular, the display 100 of the aircraft 102 is an example of a presentation for the model of the aircraft 102 that may be displayed on a display device. The model for the aircraft 102 may be generated using, for example, computer aided design (CAD) software.

In these illustrative examples, the model for the aircraft 102 used to create the display 100 is a three-dimensional representation of the aircraft 102. Further, in these examples, the display 100 of the aircraft 102 is a three-dimensional perspective view of an exterior of the aircraft 102. Additionally, the model for the aircraft 102 may include information about the aircraft 102 and the various systems, sub-systems, assemblies, and/or components that make up the aircraft 102, as well as information about the model itself.

The model for the aircraft 102 may be used for the processes of specification and design, material procurement, component and assembly manufacturing, system integration, maintenance and service, repair, and/or other suitable processes in the preproduction, manufacturing, and service of a physical aircraft based on the aircraft 102 in the model. Analysis of the aircraft 102 and/or a system, assembly, or component of the aircraft 102 in the model may be performed prior to, after, and/or during any of these processes.

For example, analysis of the aircraft 102 may be performed prior to manufacturing the aircraft 102. This analysis may be performed using a particular analysis application, depending on the implementation. Further, the analysis may be performed using information obtained from the model of the aircraft 102. In some cases, analysis may be performed for a system in the aircraft 102, such as a hydraulic system.

With reference now to FIG. 2, an illustration of a design environment is depicted in accordance with an advantageous embodiment. A design environment 200 includes a computer system 202. In this illustrative example, the computer system 202 is comprised of a number of computers 204. "A number of items", as used herein, means one or more items. For example, "a number of computers 204" means one or more computers.

In these illustrative examples, a design application 206 runs on the computer system 202. The design application 206 takes the form of a computer aided design (CAD) application in these examples. As used herein, an application comprises program code that may be run on the computer system 202 to perform different processes. An application may include, for example, at least one of a program, a plug-in, a library, a configuration file, and/or other suitable types of program code.

As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C. In other examples, "at least one of" may be, for example, without limitation, two of item A, one of item B, and 10 of item C; four of item B and seven of item C; and other suitable combinations.

In these depicted examples, the design application 206 generates a model 208 of an object 210. The model 208 for the object 210 may be used to manufacture a physical object based on the object 210 in the model 208, make changes to a physical object already being manufactured, test potential changes to the physical object, or perform other suitable design and/or manufacturing activities.

The object 210 in the model 208 may take a number of different forms. For example, the object 210 may take the form of a vehicle, a platform, a structure, an assembly, and/or some other suitable type of object. In these depicted examples, the object 210 may be an aircraft, such as the aircraft 102 in FIG. 1.

In these depicted examples, the object 210 may comprise any of a number of different systems. For example, when the object 210 is an aircraft, a system 212 in the object 210 may be, for example, without limitation, a propulsion system, an electrical system, a hydraulic system, an engine system, an environmental system, or some other suitable type of system for the aircraft.

In these depicted examples, the model 208 generated using the design application 206 may be for the object 210 and/or any of the systems for the object 210. For example, the model 208 may be for an aircraft, such as the aircraft 102 in FIG. 1, and a hydraulic system in the aircraft 102 in FIG. 1. In some cases, the model 208 may be only for the system 212.

In these illustrative examples, the system 212 for the object 210 comprises components 214. In other words, at least two components are present in the system 212. The components 214 are connected to each other in these examples.

As used herein, a first component "connected to" a second component means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

In these illustrative examples, two types of the components 214 are present in the system 212. For example, the system 212 may include created components 216, predefined components 218, or both types of components. The created components 216 are components that are designed or drawn in the computer system 202. The created components 216 may be drawn or created using, for example, the design application 206 running on the computer system 202.

The predefined components 218 are pre-existing components that may be obtained from another source. The predefined components 218 may be obtained from a file, a database, a data structure, and/or some other suitable source.

The created components 216 may include, for example, at least one of a tube, a wire, a cable, a spline, a duct, or some other suitable type of component that can be drawn or created within the computer system 202. The predefined components 218 may include, for example, at least one of a fan, a turbine, a pump, a compressor, a heat exchanger, a valve, a sensor, a computer, a switch, a router, a pump, and/or some other suitable type of component.

As illustrated, the model 208 comprises geometry 220 and attributes 222. In particular, the model 208 includes the geometry 220 and the attributes 222 for the components 214 making up the system 212 in the model 208. For example, each component in the components 214 for the system 212 may have the geometry 220 for the component and the attributes 222 for the component described in the model 208.

In these illustrative examples, the geometry 220 for a component 226 in the system 212 comprises the information describing a shape 224 for the component 226. For example, the geometry 220 may include geometric primitives 228 for the shape 224 of the component 226. The geometric primitives 228 are the simplest or smallest geometric objects that the design application 206 can process.

When the model 208 for the system 212 is a two-dimensional representation of the system 212, the geometric primitives 228 may include shapes, such as, for example, without limitation, boxes, polygons, circles, and/or other suitable two-dimensional shapes. When the model 208 for the system 212 is a three-dimensional representation of the system 212, the geometric primitives 228 may include shapes, such as, for example, without limitation, cubes, cylinders, spheres, cones, pyramids, tori, and/or other suitable three-dimensional shapes.

In these illustrative examples, an analysis application 230 runs on the computer system 202. The analysis application 230 is used to analyze the design for the object 210 in model 208 created using the design application 206.

In these illustrative examples, the analysis application 230 may not be able to use the model 208 generated using the design application 206. Further, in some cases, the model 208 may not include all of the information needed for the analysis application 230 to perform an analysis 232. For example, the model 208 generated using the design application 206, such as a computer aided design application, typically does not include a coefficient of resistance for a bend in a tube that may be a component in the components 214 for the system 212.

As illustrated, a processing module 234 runs on the computer system 202. The processing module 234 with the computer system 202 may be referred to as a modeling system. The processing module 234 may be a stand-alone process running on the computer system 202, or it may be implemented as part of another application running on the computer system 202. For example, the processing module 234 may be implemented as part of the design application 206, the analysis application 230, or a combination of the two.

The processing module 234 is configured to receive the model 208 generated by the design application 206. When the processing module 234 receives the model 208, the processing module 234 searches the model 208 to identify the components 214 for the system 212. For example, the processing module 234 identifies a set of the created components 216 and a set of the predefined components 218 in the components 214 for the system 212 to be used in performing the analysis 232.

As used herein, "a set of components" means zero, one, or more components. For example, "a set of the created components 216" may be zero of the created components 216, one of the created components 216, 15 of the created components 216, or some other number of the created components 216. In this manner, the processing module 234 may identify some or all of the created components 216 and the predefined components 218 for the system 212 in the model 208.

Thereafter, the processing module 234 identifies attributes 241 for the components 214. The attributes 241 for the components 214 identified by the processing module 234 are the attributes that are needed to perform the analysis 232. For example, the processing module 234 identifies a set of the attributes 222 for the created components 216 and the predefined components 218 identified by the processing module 234 using the model 208. In other words, in identifying the attributes 241 needed for performing the analysis 232, the processing module 234 identifies one, some, or all of the attributes 222 in the model 208 that are needed for performing the analysis 232.

Further, in these illustrative examples, the processing module 234 also may determine whether all of the attributes 241 needed for performing the analysis 232 using the analysis application 230 are identified. This determination may be based on at least one of the type of the analysis 232 to be performed, the analysis application 230 performing the analysis 232, and/or other suitable factors.

If all of the attributes 241 needed for performing the analysis 232 are not present in the attributes 222 identified from the model 208 by the processing module 234, the processing module 234 then identifies which attributes are still needed. These attributes may be referred to as needed attributes 240. In this manner, the attributes 241 needed for performing the analysis 232 include the needed attributes 240 and the attributes 222 identified using the model 208.

The process of identifying the needed attributes 240 may include, for example, without limitation, generating the needed attributes 240, locating the needed attributes 240 in a file, locating the needed attributes 240 in a database, calculating the needed attributes 240 based on the attributes 222 identified, and/or obtaining the needed attributes 240 using other suitable techniques.

In the process of identifying a created component 242 in the created components 216, the processing module 234 uses a name attribute 244. In these illustrative examples, the values for the name attribute 244 may indicate that the created component 242 is a created component and not a predefined component. The name attribute 244 that identifies the created component 242 may be, for example, without limitation, tube, pipe, duct, cable, spline, or some other suitable type of name for the name attribute 244.

In these illustrative examples, the processing module 234 identifies geometry 246 for the created component 242 as part of identifying the created component 242. For example, if the created component 242 takes the form of a tube 248, the geometry 246 may include, for example, without limitation, a total length, a thickness, coordinates for each end of the tube 248, straight sections, curved sections, an outer diameter, an inner diameter, dimensions, and/or other suitable types of information describing a shape 250 of the tube 248.

In addition, the processing module 234 also may determine whether a value is present for a part number attribute 252 for the created component 242. A presence of a value for the part number attribute 252 for the created component 242 may be used to identify additional information about the created component 242.

For example, the processing module 234 uses the part number attribute 252 to search a repository 254 for additional information about the created component 242. The repository 254 is a body or collection of information. The repository 254 may include, for example, a number of libraries, files, databases, data structures, tables, charts, and/or other suitable sources of information. The additional information stored in the repository 254 may include, for example, without limitation, a type of material, an identification of a thermal coefficient of expansion, and/or other suitable types of information.

In particular, the repository 254 includes performance information 255 for at least a portion of the components 214 in the system 212. The performance information 255 may include, for example, without limitation, operating parameters, heat coefficients, reliability indices, relationships between components, effects of components being connected to other components, performance constraints, and/or other types of performance information.

The processing module 234 may be configured to identify components having the performance information 255 in the repository 254. When a component in the components 214 for the system 212 has the performance information 255 in the repository 254, the performance information 255 is used to obtain an attribute for performance of the component.

In this manner, the process for identifying the created component 242 includes identifying at least one of the name attribute 244, the part number attribute 252, and other attributes 222 for the created component 242, as well as additional information about the created component 242 that may be found in the repository 254 and/or using some other suitable source of information. This type of process is performed for each created component in the created components 216 identified by the processing module 234 for the system 212 in the model 208.

In these illustrative examples, identifying a predefined component 256 in the predefined components 218 for the system 212 also may include identifying a name attribute 258 and a part number attribute 260 for the predefined component 256. With the part number attribute 260, the processing module 234 may query or access the repository 254 to obtain additional information about the predefined component 256 if needed.

This additional information also may include, for example, without limitation, geometry 262 for the predefined component 256 and connection points 264 for the predefined component 256. The geometry 262 provides information for a shape 266 of the predefined component 256. The connection points 264 provide a number of locations at which the created component 242 may be connected to the predefined component 256. A location is described using coordinates in the coordinate system for model 208 in these examples. The location of ends of the created component 242 and the location of the connection points 264 may be used to identify a relationship or connection between the created component 242 and the predefined component 256.

Additionally, other information may be obtained from the repository 254 using the part number attribute 260 for the predefined component 256. For example, the efficiency, operating temperature, and/or other suitable information for the predefined component 256 also may be obtained.

In this manner, the process for identifying the predefined component 256 includes identifying at least one of the name attribute 258, the part number attribute 260, the geometry 262, the connection points 264, and other attributes 222 for the predefined component 256. Further, the process also includes identifying additional information about the predefined component 256 that may be found in the repository 254 and/or using some other suitable source of information. This type of process is performed for each predefined component in the predefined components 218 identified by the processing module 234 for the system 212 in the model 208.

In these illustrative examples, the processing module 234 is configured to generate data 263 using the created components 216, the predefined components 218, the attributes 222, and/or any of the needed attributes 240 that may be identified using the model 208. In other words, the processing module 234 includes the created components 216, the predefined components 218, the attributes 222, and any of the needed attributes 240 identified in the data 263. In the illustrative examples, the data 263 may be stored in a data structure such as a file, a database, and other suitable types of data structures.

The data 263 is configured to be used by the analysis application 230. In other words, the data 263 has the information needed to perform the analysis 232, and the information is in a format that is recognized and usable by the analysis application 230. In particular, the data 263 is used by the analysis application 230 to perform the analysis 232. In these illustrative examples, the data 263 may contain a model 268 of the system 212, which is a different model than the model 208 generated using the design application 206. The model 268 generated by the processing module 234 includes substantially all of the information needed by the analysis application 230 to perform the analysis 232. Further, the model 268 generated by the processing module 234 is in a format that can be processed by the analysis application 230.

The analysis application 230 may be, for example, without limitation, a finite element analysis application, a system analysis application, a computer aided engineering application, a computer aided analysis application, or some other suitable type of analysis application. Any presently available software for performing the desired type of analysis may be used. For example, a system analysis application may be used to perform analysis 232 in the form of, for example, simulations. These simulations may include fluid flow, loading, and/or other suitable types of simulations.

Based on the analysis 232 performed by the analysis application 230, a determination may be made as to whether the system 212 for the object 210 and/or the object 210 performs as desired. Further, based on the analysis 232 of the model 268 generated by the processing module 234, adjustments may be made to the model 208 generated using the design application 206. After adjustments are made to the model 208 generated using the design application 206, the processing module 234 may then create new data to be analyzed using the analysis application 230.

In these illustrative examples, the model 208 generated using the design application 206 may be presented as a display 270 on a display device 272 in communication with the computer system 202. The display device 272 may be connected to the computer system 202 using wires and/or wirelessly. The display 270 that is displayed on the display device 272 is a presentation of the model 208. The display 270 may include at least one of the object 210, the system 212 for the object 210, and a component in the components 214 for the object 210.

In some cases, the model 268 generated by the processing module 234 may also be presented on the display device 272. Further, results 274 of the analysis 232 performed by the analysis application 230 may also be displayed on the display device 272. In these illustrative examples, the results 274 identify a performance of the components 214.

The illustration of the design environment 200 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, the system 212 may be for objects other than an aircraft. For example, without limitation, the system 212 may be designed for use in other types of objects. For example, without limitation, the object 210 may be a mobile platform, a stationary platform, a land-based structure, an aquatic-based structure, a space-based structure, or some other suitable type of platform. More specifically, the object 210 may be a submarine, a bus, a personnel carrier, a tank, a train, a spacecraft, a space station, a satellite, a surface ship, a power plant, a van, a manufacturing facility, a city water system, a building, or some other suitable type of object.

In this manner, the system 212 for which the model 208 is generated using the design application 206 may be for any system in any of these types of objects and/or platforms and/or for any of these types of objects and/or platforms.

In some illustrative examples, the model 208 generated by the design application 206, the model 268 generated by the processing module 234, and/or the results 274 of the analysis 232 performed by the analysis application 230 may be presented as displays on different display devices.

With reference now to FIG. 3, an illustration of attributes for a created component is depicted in accordance with an advantageous embodiment. In this illustrative example, a created component 300 is an example of one of the created components 216 in FIG. 2. The created component 300 is a pipe line 302.

Attributes 303 for the pipe line 302 may include, for example, without limitation, a schematic symbol identifier 304, a schematic symbol name 306, a friction factor table identifier 308, a pressure drop coefficient table identifier 310, a friction factor constant 312, a pressure drop coefficient 314, a Mach number at outlet 316, a flow factor exponent 318, a line length 320, a diameter 322, a cross-sectional area 324, an inside diameter 326, a wall thickness 328, and/or other suitable attributes.

With reference now to FIG. 4, an illustration of attributes for a predefined component is depicted in accordance with an advantageous embodiment. In this illustrative example, a predefined component 400 is an example of one of the predefined components 218 in FIG. 2. The predefined component 400 is a pressure regulator 402.

Attributes 403 for the pressure regulator 402 may include, for example, without limitation, a schematic symbol identifier 404, a schematic symbol name 406, a pressure drop coefficient table identifier 408, a pressure drop coefficient 410, a flow factor exponent 412, a diameter 414, and a regulator pressure setting 416.

The illustrations of the attributes 303 in FIG. 3 and the attributes 403 in FIG. 4 are only some examples of attributes. The pipe line 302 and the pressure regulator 402 may have other attributes in addition to or in place of the ones presented. Of course, other types of components may have the same and/or different attributes as the ones presented.

The illustrations of attributes for created component 300 in FIG. 3 and predefined component 400 in FIG. 4 are only meant as examples of some of the types of components and information that may be included for attributes. Other components may have other types or numbers of attributes in addition to or in place of the ones in these illustrative examples.

Figure 5:
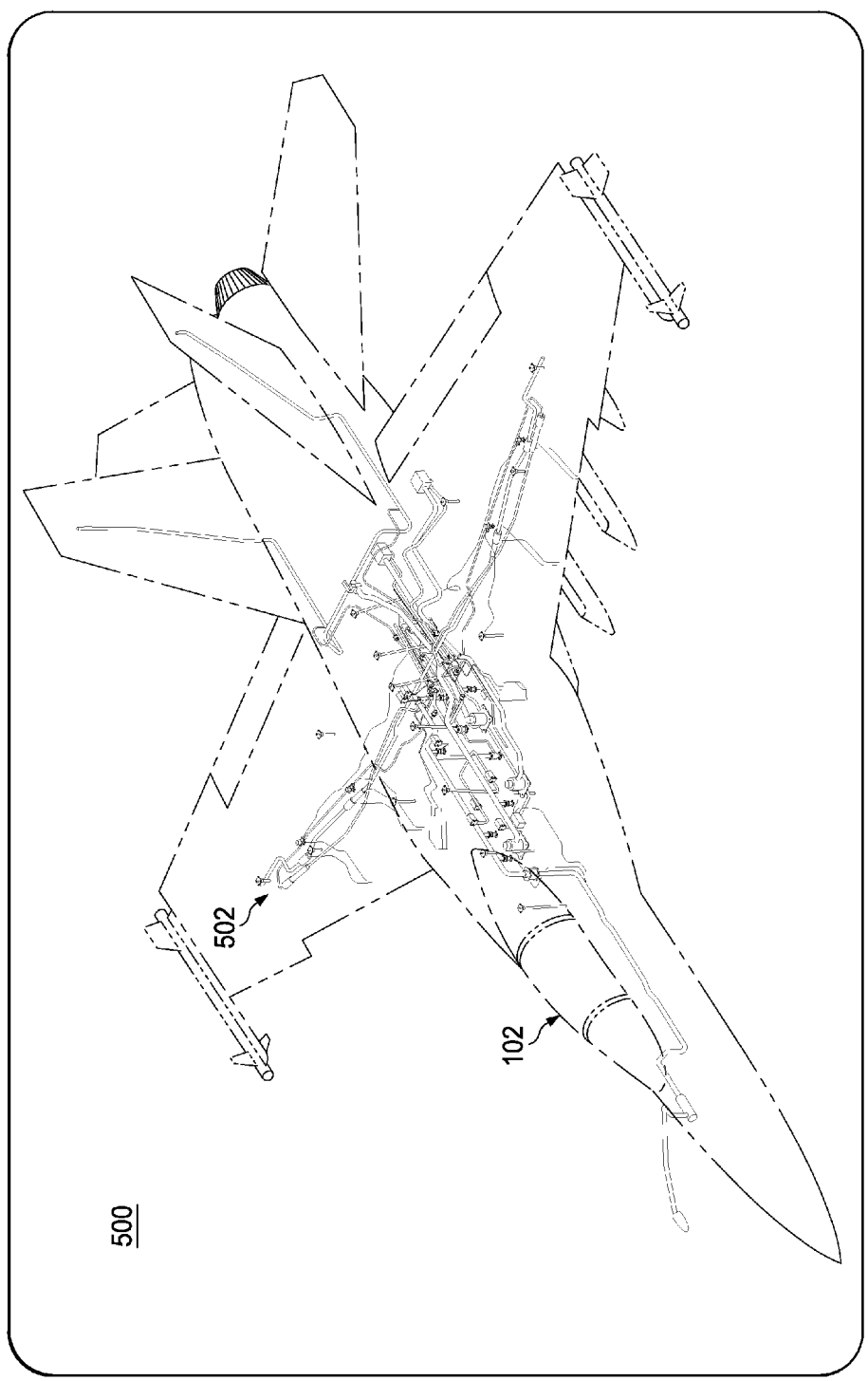
FIG. 5 is an illustration of a display of an aircraft in accordance with an advantageous embodiment.

With reference now to FIG. 5, an illustration of a display of an aircraft is depicted in accordance with an advantageous embodiment. In this illustrative example, a display 500 of the aircraft 102 from FIG. 1 now includes a hydraulic system 502 for the aircraft 102.

The display 500 of the aircraft 102 and the hydraulic system 502 is an example of another type of presentation of the model for the aircraft 102 as compared to the display 100 of the aircraft 102 in FIG. 1. The model for the aircraft 102 may be one example of the model 208 in FIG. 2. The display 500 of the aircraft 102 in this example, as well as the display 100 of the aircraft 102 in FIG. 1, is an example of one manner in which a model, such as the model 208 in FIG. 2, may be presented.

In this depicted example, the display 500 of the aircraft 102 is a partially-exposed view of the aircraft 102 that allows the hydraulic system 502 in the aircraft 102 to be seen. The hydraulic system 502 is an example of one type of the system 212 in FIG. 2 that may be modeled.

Figure 6:
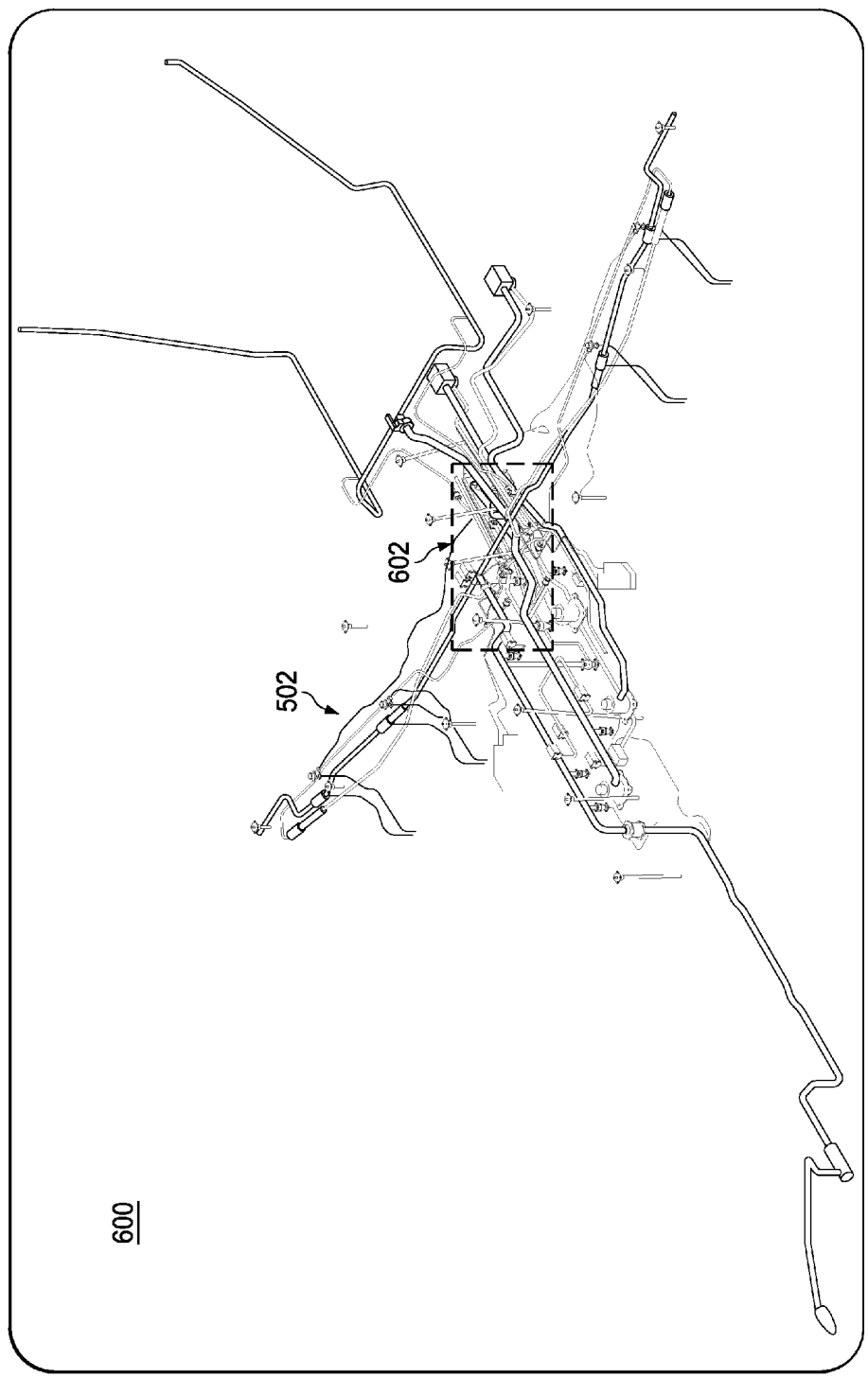
FIG. 6 is an illustration of a display of a hydraulic system for an aircraft in accordance with an advantageous embodiment.

Turning now to FIG. 6, an illustration of a display of a hydraulic system for an aircraft is depicted in accordance with an advantageous embodiment. In this illustrative example, a display 600 of the hydraulic system 502 from FIG. 5 for the aircraft 102 in FIGS. 1 and 5 does not include a presentation of the aircraft 102. In other words, only the hydraulic system 502 is displayed in the display 600. As depicted, the hydraulic system 502 for the aircraft 102 has a section 602 containing components that may be identified for analysis.

Figure 7:
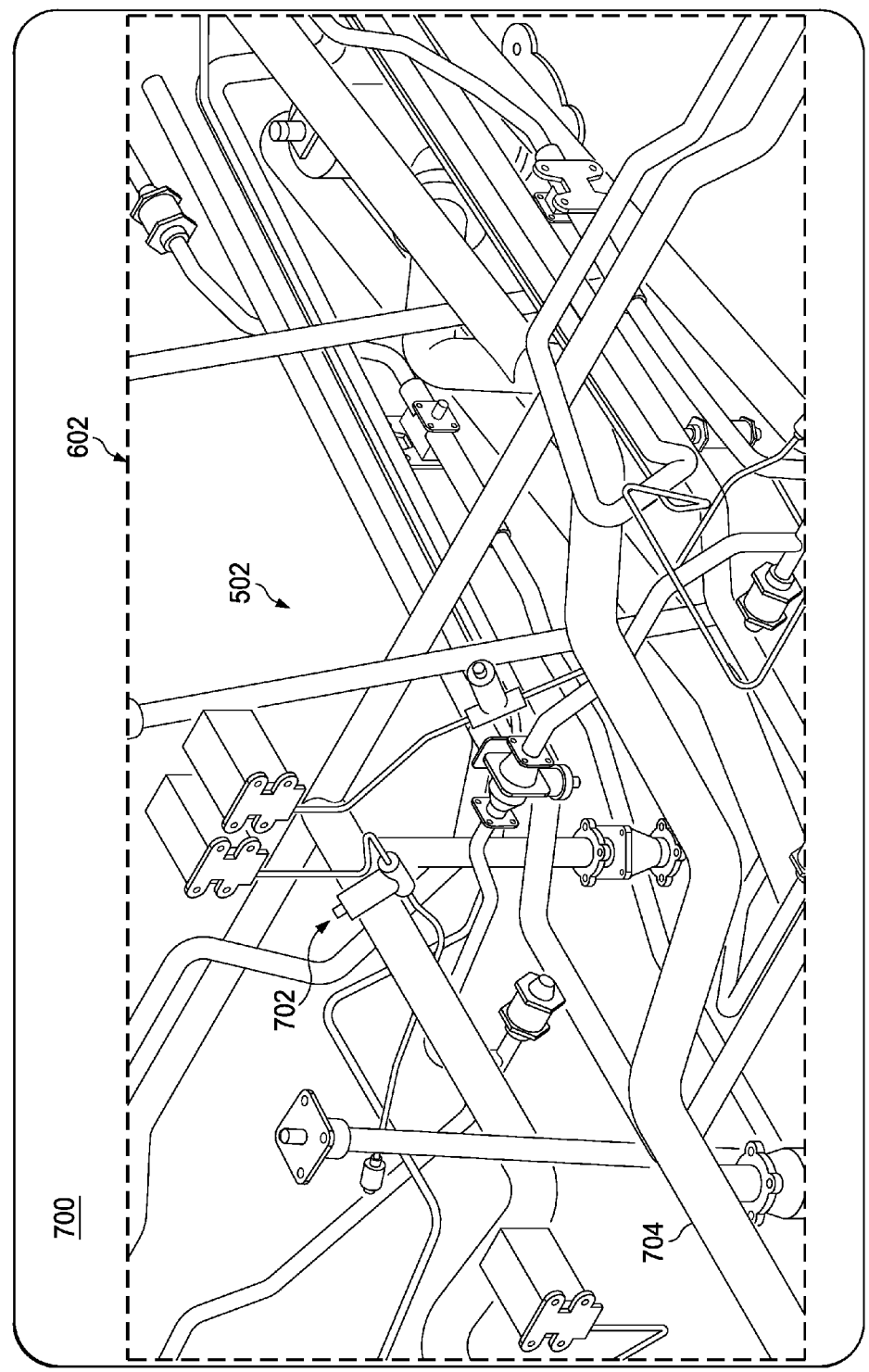
FIG. 7 is an illustration of a display of a section of a hydraulic system for an aircraft in accordance with an advantageous embodiment.

With reference now to FIG. 7, an illustration of a display of a section of a hydraulic system for an aircraft is depicted in accordance with an advantageous embodiment. In this illustrative example, a display 700 of the section 602 of the hydraulic system 502 from FIG. 6 is depicted. As illustrated, the section 602 of the hydraulic system 502 includes various components that may be identified when performing the analysis 232 of the hydraulic system 502 and/or the aircraft 102 using the analysis application 230 in FIG. 2.

For example, a first component 702 and a second component 704 are examples of components that may be identified for performing the analysis 232 using the data 263 in FIG. 2. In other words, the first component 702 and the second component 704, as well as the attributes 222 and the geometry 220 for these components, may be identified in the data 263. The data 263 may be used in performing the analysis 232.

Figure 8:
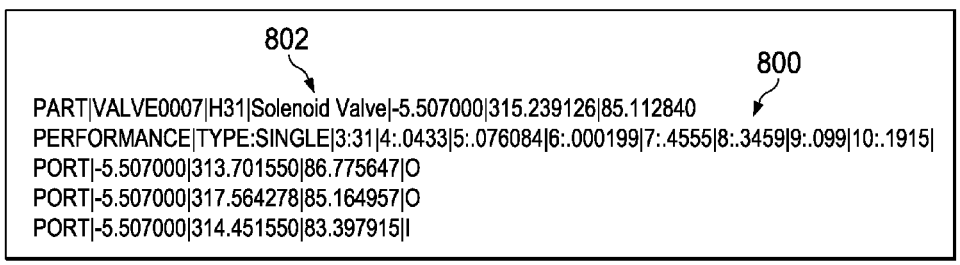
FIG. 8 is an illustration of a portion of data generated by a processing module in accordance with an advantageous embodiment.

Turning now to FIG. 8, an illustration of a portion of data generated by a processing module is depicted in accordance with an advantageous embodiment. In this illustrative example, a portion 800 of data 802 that may be generated by the processing module 234 in FIG. 2 is depicted. The portion 800 of the data 802 contains attributes that may be identified by the processing module 234 for the first component 702 in the section 602 of the hydraulic system 502 in FIG. 7.

The data 802 is in a format that can be processed by the analysis application 230 in FIG. 2. In this manner, the portion 800 of the data 802 for the first component 702 may be used in performing the analysis 232 of the first component 702 and/or the hydraulic system 502.

Figure 9:
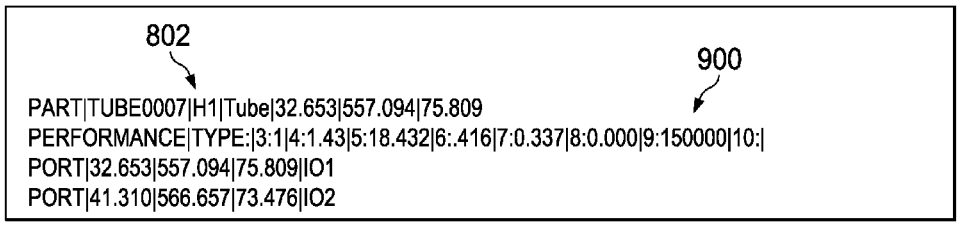
FIG. 9 is an illustration of a portion of data generated by a processing module in accordance with an advantageous embodiment.

In FIG. 9, an illustration of a portion of a data generated by a processing module is depicted in accordance with an advantageous embodiment. In this illustrative example, a portion 900 of the data 802 contains attributes that may be identified by the processing module 234 for the second component 704 in the section 602 of the hydraulic system 502 from FIG. 7. The portion 900 of the data 802 may be used in performing the analysis 232 of the second component 704 and/or the hydraulic system 502.

Figure 10:
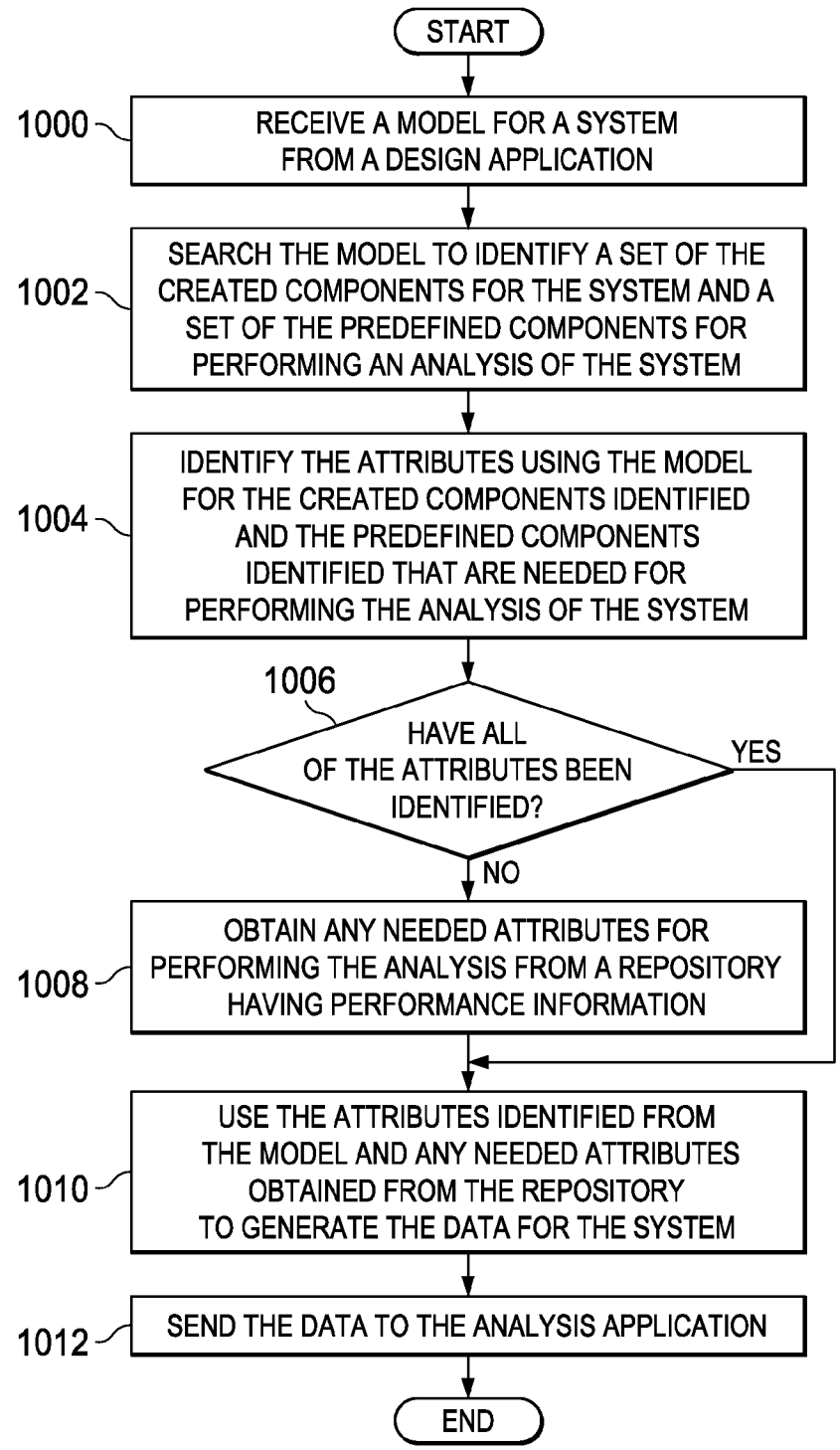
FIG. 10 is an illustration of a flowchart of a process for processing a model for a system in accordance with an advantageous embodiment.

With reference now to FIG. 10, an illustration of a flowchart of a process for processing a model for a system is depicted in accordance with an advantageous embodiment. The process illustrated in FIG. 10 may be implemented using the processing module 234 in FIG. 2.

The process begins by receiving the model 208 for the system 212 from the design application 206 (operation 1000). The model 208 is a representation of the system 212 and includes information about the components 214 in the system 212. This information may be, for example, metadata. For example, the model 208 includes the geometry 220 and the attributes 222 for the components 214 in the system 208.

The process then searches the model 208 to identify the set of the created components 216 for the system 212 and the set of the predefined components 218 for performing the analysis 232 of the system 212 (operation 1002). The created components 216 and the predefined components 218 identified may be some or all of the created components 216 and the predefined components 218 in the model 208 for the system 212. In this manner, the process identifies the components 214 in the system 212 for use with the model 208 of the system 212 in operation 1002.

The process then identifies the attributes 222 using the model 208 for the created components 216 identified and the predefined components 218 identified that are needed for performing the analysis 232 of the system 212 (operation 1004). The attributes 222 identified may be some or all of the attributes 222 for the components 214 in the model 208. In other words, the attributes 222 identified in operation 1004 may be a subset of the attributes 222 in the model 208.

Thereafter, the process determines whether all of the attributes 222 needed for performing the analysis 232 have been identified using the model 208 (operation 1006). If all of the attributes 222 have not been identified using the model 208, the process obtains any needed attributes 240 for performing the analysis 232 from the repository 254 having the performance information 255 (operation 1008). In this manner, in operation 1006 and operation 1008, the process identifies attributes 222 for the components 214 using the model 208 and the repository 254.

Then, the process uses the attributes 222 identified from the model 208 and any needed attributes 240 obtained from the repository 254 to generate the data 263 for the system 212 (operation 1010). The data 263 includes the model 268 of the system 212 that can be used by the analysis application 230 to perform the analysis 232 of the system 212. In particular, the model 268 in the data 263 contains the attributes 222 in the model 208 and any needed attributes 240 needed for performing the analysis 232 using the analysis application 230. The data 263 is configured for use by the analysis application 230. In other words, the data 263 is in a format that can be processed by the analysis application 230.

The process then sends the data 263 to the analysis application 230 (operation 1012), with the process terminating thereafter.

With reference again to operation 1006, if all of the attributes needed for performing the analysis 232 have been identified using the model 208, the process proceeds to operation 1010 as described above.

Figure 11:
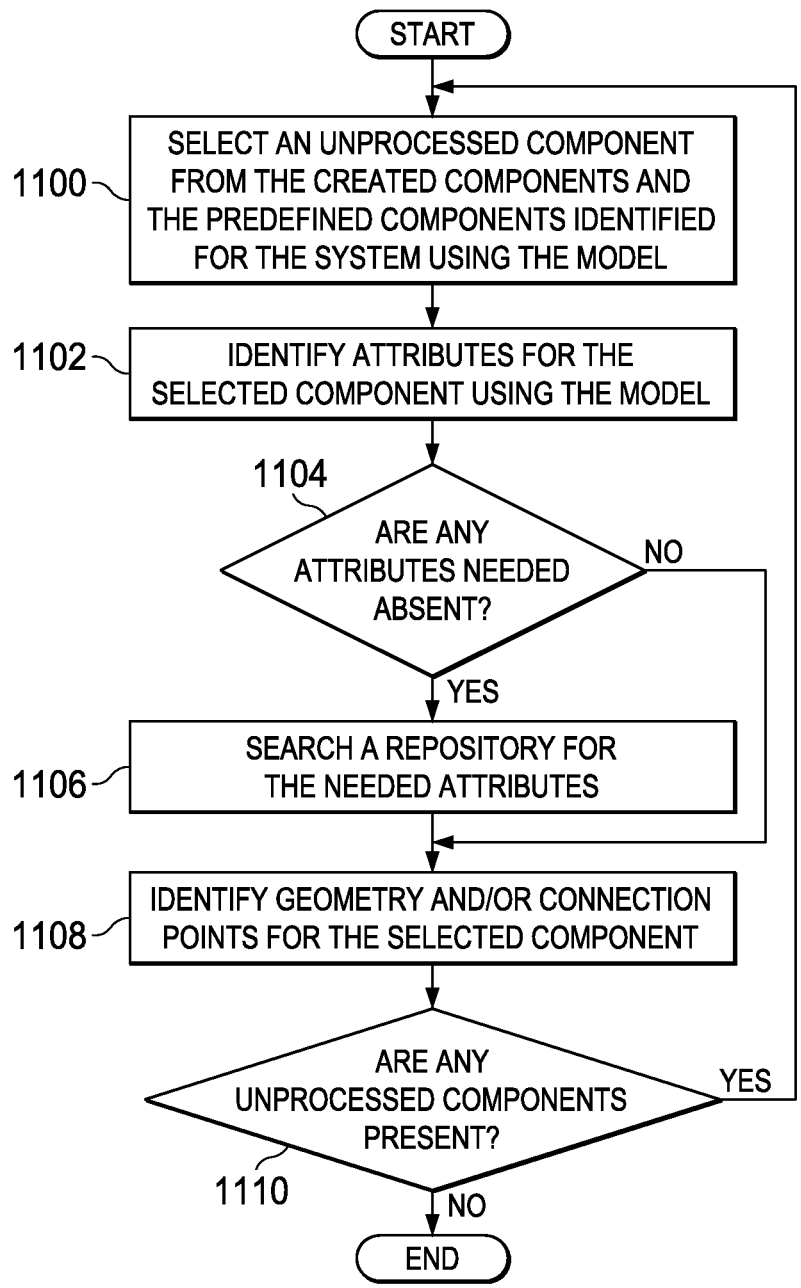
FIG. 11 is an illustration of a flowchart of a process for identifying attributes for a component in a system in accordance with an advantageous embodiment.

Turning now to FIG. 11, an illustration of a flowchart of a process for identifying attributes for a component in a system is depicted in accordance with an advantageous embodiment. The process illustrated in FIG. 11 may be to implement operations 1004, 1006, and 1008 in FIG. 10.

The process begins by selecting an unprocessed component from the created components 216 and the predefined components 218 identified for the system 212 using the model 208 (operation 1100). The process then identifies the attributes 241 for the selected component using the model 208 (operation 1102).

In some cases, operation 1102 may include identifying calculated attributes for the selected component. Calculated attributes are attributes that are identified by calculating values for the attributes. These calculations may be based on the attributes identified using the model 208. Calculated attributes may be identified using various computational techniques. In other words, values for the attributes 241 for a component in the model 208 may be used to perform calculations to identify a calculated attribute.

Thereafter, the process determines whether any of the attributes 241 needed to perform the analysis 232 of the system 212 are absent (operation 1104). If any of the attributes 241 needed to perform the analysis 232 of the system 212 are absent, the process searches the repository 254 for the needed attributes 240 (operation 1106).

Next, the process identifies the geometry 220 and/or connection points for the selected component (operation 1108). For example, when the selected component is a predefined component, geometry and connection points may be identified for the selected component. The geometry for a component describes a shape of the component.

When the selected component is a created component, geometry is identified for the selected component. In some cases, locations for connections of the created component to connection points on a predefined component may be identified.

Thereafter, the process determines whether any unprocessed components are present (operation 1110). If unprocessed components are not present, the process terminates. Otherwise, the process returns to operation 1100 as described above.

With reference again to operation 1104, if none of the attributes 241 needed to perform the analysis 232 of the system 212 are absent, the process proceeds to operation 1108 as described above. In this illustrative example, the different iterations of operation 1102 are performed to perform operation 1004 in FIG. 10 for identifying the attributes 222 for the components 214. Further, the different iterations of operation 1104 are performed to perform operation 1006 in FIG. 10 for determining whether any attributes 222 needed for performing the analysis 232 are absent. Still further, the different iterations of operation 1106 are performed to identify the needed attributes 240 from the repository 254.

Figure 12:
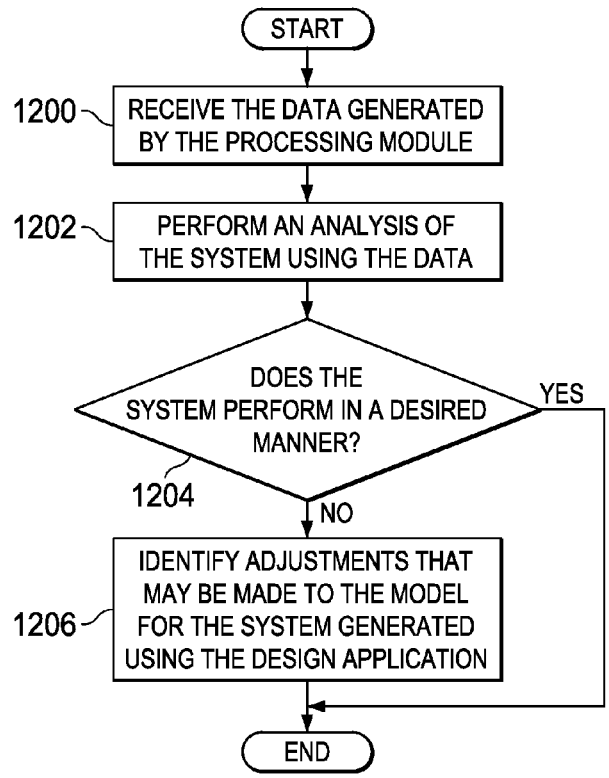
FIG. 12 is an illustration of a flowchart of a process for performing an analysis of a system in accordance with an advantageous embodiment.

Turning now to FIG. 12, an illustration of a flowchart of a process for performing an analysis of a system is depicted in accordance with an advantageous embodiment. The process illustrated in FIG. 12 may be implemented using the analysis application 230 in FIG. 2.

The process begins by receiving the data 263 generated by the processing module 234 (operation 1200). This data may be received as a file, from a database, or in some other suitable manner. The data 263 received in this operation is same as the data 263 generated in operation 1110 in FIG. 11. The data 263 contains the model 268 of the system 212 to be analyzed and/or other suitable information in this illustrative example. The process then performs the analysis 232 of the system 212 using the data 263 (operation 1202).

The process then determines whether the system 212 performs in a desired manner based on the results 274 of the analysis 232 (operation 1204). If the system 212 performs in a desired manner, the process terminates. Otherwise, the process identifies adjustments that may be made to the model 208 for the system generated using the design application 206 (operation 1206), with the process terminating thereafter.

Figure 13:
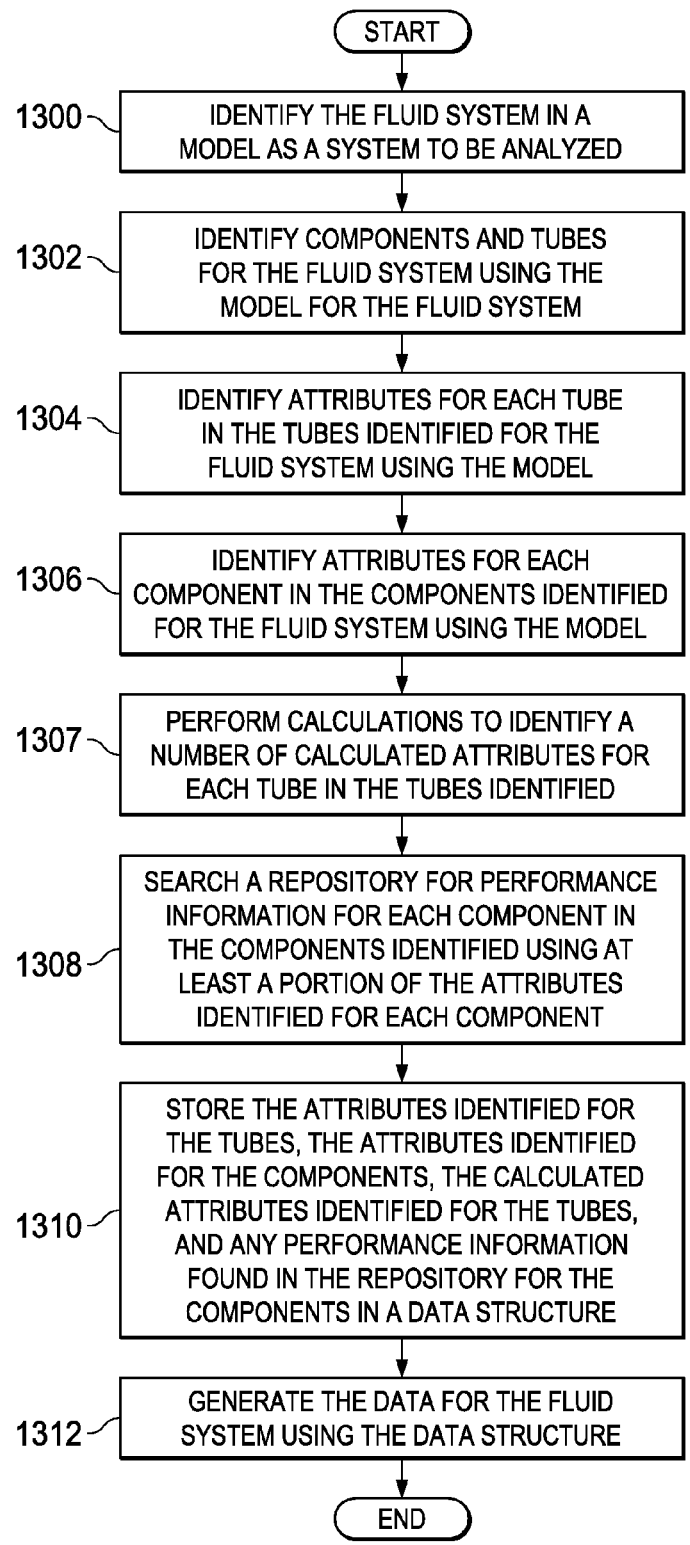
FIG. 13 is an illustration of a flowchart of a process for processing a model for a fluid system in accordance with an advantageous embodiment.

With reference now to FIG. 13, an illustration of a flowchart of a process for processing a model for a fluid system is depicted in accordance with an advantageous embodiment. The process illustrated in FIG. 13 may be implemented using the processing module 234 in FIG. 2. Further, this process may be implemented to process the model 208 for a fluid system for an aircraft, such as the aircraft 102 in FIG. 1.

The process begins by identifying the fluid system in the model 208 as the system 212 to be analyzed (operation 1300). In other words, the fluid system is an example of the system 212 in the model 208 that is to be analyzed. This identification may be based on, for example, user input indicating that the fluid system for the aircraft is to be analyzed. The process then identifies components and tubes for the fluid system using the model 208 for the fluid system (operation 1302). The components and tubes identified for the fluid system make up the fluid system.

Thereafter, the process identifies the attributes 222 for each tube in the tubes identified for the fluid system using the model 208 (operation 1304). The attributes identified for each tube in operation 1304 may include, for example, without limitation, a part number, endpoint coordinates, a total length, an outer diameter, an inner diameter, a wall thickness, a bend angle, a radius of bend, and/or other suitable attributes for a tube.

The process also identifies the attributes 222 for each component in the components identified for the fluid system using the model 208 (operation 1306). The attributes 222 identified for each component in operation 1306 may include, for example, without limitation, a part number, a part name, one or more connection point coordinates, a centroid coordinate, and/or other suitable information for a component.

Then, calculations are performed to identify a number of calculated attributes for each tube in the tubes identified (operation 1307). These calculations may be based on the attributes 222 identified for the tubes in operation 1304.

In this illustrative example, a coefficient of resistance, or K-value, is an example of a calculated attribute. The coefficient of resistance may be calculated for each bend in a curved or bended section of a tube. The coefficient of resistance is calculated using the total length, inner diameter, bend angle, and radius of bend for the bend for a tube. For example, the coefficient of resistance may be calculated using the following equations:

$$K=1.46017-2.33930*RD+1.86681*RD**2-0.774919*RD**3+0.160372*RD**4-0.0129661*RD**5, \quad (1)$$

$$C=0.221434E-3+0.160218E-1*THETA-0.474620E-4*THETA**2-0.175869E-6*THETA**3+0.109053E8*THETA**4, \quad (2)$$

and $$K\text{-Value}=C*K, \quad (3)$$

where K is height-to-width ratio resistance, RD is the radius of bend for the outer diameter for a bend in the tube, THETA is the bend angle, C is coefficient of elongation, and E is the exponent function.

Further, the process searches the repository 254 for the performance information 255 for each component in the components identified using at least a portion of the attributes identified for each component (operation 1308). For example, in operation 1308, one or more of the attributes identified for each component in operation 1306 may be used to search the repository 254 for the performance information 255. In particular, one attribute identified for a component may be a part number. The part number may be used to search the repository for the performance information 255 for the component.

Thereafter, the process stores the attributes 222 identified for the tubes, the attributes 222 identified for the components, the calculated attributes identified for the tubes, and any performance information 255 found in the repository 254 for the components in a data structure (operation 1310). The data structure may be, for example, a data array, a table, a chart, a database, or some other suitable type of data structure.

The process then generates the data 263 for the fluid system using the data structure (operation 1312), with the process terminating thereafter. The data 263 is configured for use in performing the analysis 232 of the fluid system using the analysis application 230. In other words, the items in the data structure may be placed or changed into a form that is used by analysis application 230. The data 263 includes the model 268 of the fluid system that is different from the model 208 used to identify the different components in the fluid system.

Figure 14:
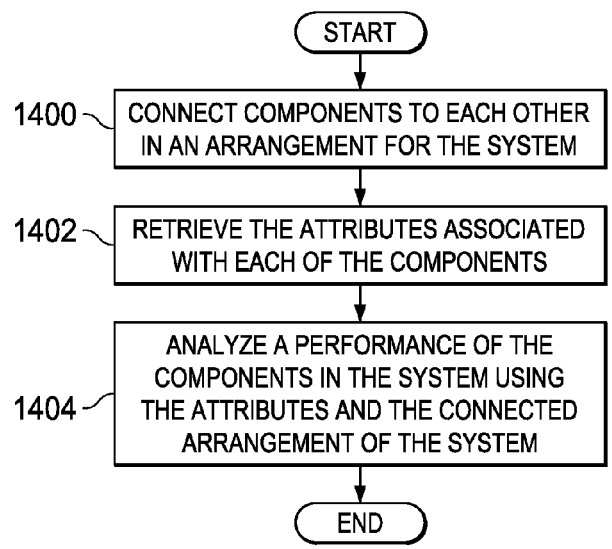
FIG. 14 is an illustration of a flowchart of a process for analyzing a system in accordance with an advantageous embodiment.

Turning next to FIG. 14, an illustration of a flowchart of a process for analyzing a system is depicted in accordance with an advantageous embodiment. The process illustrated in FIG. 14 may be implemented in the design environment 200 in FIG. 2. As an illustrative example, the process may be implemented in the analysis application 230 in FIG. 2. In some examples, a portion of the process may be implemented by the processing module 234 in FIG. 2.

The process begins by connecting components 214 to each other in an arrangement for the system 212 (operation 1400). This connection may be performed in response to receiving user input or the model 208 of the system 212. The connection may be performed by the processing module 234, the analysis application 230, or both. In particular, the components 214 may be graphically connected in a graphical user environment.

In one illustrative example, an operator of the software may use a mouse or other pointing device to move the components 214 into positions relative to each other to form an arrangement for the system 212. The components 214 are connected to each other in this arrangement for the system 212.

The process retrieves the attributes 241 associated with each of the components 214 (operation 1402). The attributes 241 may be retrieved from the repository 254 or from other sources. The attributes 241 include information about the performance of each of the components 214. In operation 1402, the attributes 241 may be retrieved electronically.

The process then analyzes a performance of the components 214 in the system 212 using the attributes 241 and the connected arrangement of the system 212 (operation 1404), with the process terminating thereafter.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

For example, in some illustrative examples, operation 1306 may be performed prior to operation 1304. In some cases, operation 1306 and operation 1304 may be performed at the same time. In other examples, operation 1307 and operation 1308 may be performed at the same time.

Turning now to FIG. 15, an illustration of a data processing system is depicted in accordance with an advantageous embodiment. In this illustrative example, a data processing system 1500 may be used to implement computers, such as the number of computers 204 in the computer system 202 in FIG. 2. In this illustrative example, the data processing system 1500 includes a communications fabric 1502, which provides communications between a processor unit 1504, a memory 1506, a persistent storage 1508, a communications unit 1510, an input/output (I/O) unit 1512, and a display 1514.

The processor unit 1504 serves to execute instructions for software that may be loaded into the memory 1506. The processor unit 1504 may be a number of processors, a multi-processor core, or some other type of processor, depending on the particular implementation. A number, as used herein with reference to an item, means one or more items. Further, the processor unit 1504 may be implemented using a number of heterogeneous processor systems in which a main processor is present with secondary processors on a single chip. As another illustrative example, the processor unit 1504 may be a symmetric multi-processor system containing multiple processors of the same type.

The memory 1506 and the persistent storage 1508 are examples of storage devices 1516. A storage device is any piece of hardware that is capable of storing information, such as, for example, without limitation, data, program code in functional form, and/or other suitable information, either on a temporary basis and/or a permanent basis. The storage devices 1516 may also be referred to as computer readable storage devices in these examples. The memory 1506, in these examples, may be, for example, a random access memory or any other suitable volatile or non-volatile storage device. The persistent storage 1508 may take various forms, depending on the particular implementation.

For example, the persistent storage 1508 may contain one or more components or devices. For example, the persistent storage 1508 may be a hard drive, a flash memory, a rewritable optical disk, a rewritable magnetic tape, or some combination of the above. The media used by the persistent storage 1508 also may be removable. For example, a removable hard drive may be used for the persistent storage 1508.

The communications unit 1510, in these examples, provides for communications with other data processing systems or devices. In these examples, the communications unit 1510 is a network interface card. The communications unit 1510 may provide communications through the use of either or both physical and wireless communications links.

The input/output unit 1512 allows for input and output of data with other devices that may be connected to the data processing system 1500. For example, the input/output unit 1512 may provide a connection for user input through a keyboard, a mouse, and/or some other suitable input device. Further, the input/output unit 1512 may send output to a printer. The display 1514 provides a mechanism to display information to a user.

Instructions for the operating system, applications, and/or programs may be located in the storage devices 1516, which are in communication with the processor unit 1504 through the communications fabric 1502. In these illustrative examples, the instructions are in a functional form on the persistent storage 1508. These instructions may be loaded into the memory 1506 for execution by the processor unit 1504. The processes of the different embodiments may be performed by the processor unit 1504 using computer implemented instructions, which may be located in a memory, such as the memory 1506.

These instructions are referred to as program code, computer usable program code, or computer readable program code that may be read and executed by a processor in the processor unit 1504. The program code in the different embodiments may be embodied on different physical or computer readable storage media, such as the memory 1506 or the persistent storage 1508.

A program code 1518 is located in a functional form on a computer readable media 1520 that is selectively removable and may be loaded onto or transferred to the data processing system 1500 for execution by the processor unit 1504. The program code 1518 and the computer readable media 1520 form a computer program product 1522 in these examples. In one example, the computer readable media 1520 may be a computer readable storage media 1524 or a computer readable signal media 1526. The computer readable storage media 1524 may include, for example, an optical or magnetic disk that is inserted or placed into a drive or other device that is part of the persistent storage 1508 for transfer onto a storage device, such as a hard drive, that is part of the persistent storage 1508.

The computer readable storage media 1524 also may take the form of a persistent storage, such as a hard drive, a thumb drive, or a flash memory, that is connected to the data processing system 1500. In some instances, the computer readable storage media 1524 may not be removable from the data processing system 1500. In these examples, the computer readable storage media 1524 is a physical or tangible storage device used to store the program code 1518, rather than a medium that propagates or transmits the program code 1518. The computer readable storage media 1524 is also referred to as a computer readable tangible storage device or a computer readable physical storage device. In other words, the computer readable storage media 1524 is a media that can be touched by a person.

Alternatively, the program code 1518 may be transferred to the data processing system 1500 using the computer readable signal media 1526. The computer readable signal media 1526 may be, for example, a propagated data signal containing the program code 1518. For example, the computer readable signal media 1526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, the program code 1518 may be downloaded over a network to the persistent storage 1508 from another device or data processing system through the computer readable signal media 1526 for use within the data processing system 1500. For instance, program code stored in a computer readable storage medium in a server data processing system may be downloaded over a network from the server to the data processing system 1500. The data processing system providing the program code 1518 may be a server computer, a client computer, or some other device capable of storing and transmitting the program code 1518.

The different components illustrated for the data processing system 1500 are not meant to provide architectural limitations to the manner in which different embodiments may be implemented. The different advantageous embodiments may be implemented in a data processing system including components in addition to or in place of those illustrated for the data processing system 1500.

Other components shown in FIG. 15 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, the processor unit 1504 may take the form of a hardware unit that has circuits that are manufactured or configured for a particular use. This type of hardware may perform operations without needing program code to be loaded into a memory from a storage device to be configured to perform the operations.

For example, when the processor unit 1504 takes the form of a hardware unit, the processor unit 1504 may be a circuit system, an application specific integrated circuit (ASIC), a programmable logic device, or some other suitable type of hardware configured to perform a number of operations. With a programmable logic device, the device is configured to perform the number of operations.

The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, the program code 1518 may be omitted, because the processes for the different embodiments are implemented in a hardware unit.

In still another illustrative example, the processor unit 1504 may be implemented using a combination of processors found in computers and hardware units. The processor unit 1504 may have a number of hardware units and a number of processors that are configured to run the program code 1518. With this depicted example, some of the processes may be implemented in the number of hardware units, while other processes may be implemented in the number of processors.

In another example, a bus system may be used to implement the communications fabric 1502 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, the memory 1506, or a cache, such as found in an interface and memory controller hub that may be present in the communications fabric 1502.

Thus, the different advantageous embodiments provide a method and apparatus for processing models. In the different advantageous embodiments, the processing of the models may be performed in a manner to generate the data 263 for analysis. The data 263 may take the form of the model 268 that is specifically designed or configured to be run by a particular analysis application.

For example, in one advantageous embodiment, a method is provided for processing the model 208 for the system 212. The components 214 in the system 212 are identified using the model 208 for the system 212. The attributes 222 for the components 214 are identified using the model 208 and the repository 254 having the performance information 255. The data 263 is generated using the attributes 222. The data 263 is configured for use by a particular analysis application 230.

The different advantageous embodiments provide a method for processing a model generated using a computer aided design application that reduces the time and/or effort needed for moving information from the model to an analysis application.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for generating data for analysis from a model for a system, the method comprising:

identifying, by a processor unit, components in the system using the model for the system;

identifying, by the processor unit, attributes for the components using the model and a repository having performance information, the identifying comprising calculating, by the processor unit, a coefficient of resistance for a bend in a tube in a set of tubes using a radius of bend for an outside diameter and a bend angle for the bend;

generating, by the processor unit, the data using the attributes, wherein the data is configured for use by at least one of a finite element analysis application and a simulation application;

performing, by the processor unit, an analysis of the system using the data and the at least one of the finite element analysis application and the simulation application; and adjusting, using the processor unit, the model based on results of the analysis, wherein the results identify a performance of the components.

2. The method of claim 1, further comprising:
generating the model and components in the components using a design application run by the processor unit; and
wherein:
the model comprises the components in the system,
the components in the system are connected in the model,
the performance information in the repository comprises effects of the components in the system being connected.

3. The method of claim 1, wherein the step of identifying the components in the system using the model comprises:
identifying, by the processor unit, a set of created components in the system, wherein the set of created components is designed or drawn using a computer aided design (CAD) application; and
identifying, by the processor unit, a set of predefined components in the system, wherein the set of predefined components comprises pre-existing components obtained from a source other than the computer aided design (CAD) application.

4. The method of claim 3, wherein the step of identifying the attributes of the components using the model and the repository having the performance information comprises:
identifying, by the processor unit, the attributes for the set of created components in the system and the set of predefined components in the system.

5. The method of claim 4, wherein the step of identifying the attributes for the set of created components in the system and the set of predefined components in the system comprises:
identifying, by the processor unit, first geometry and first attributes for the set of created components;
identifying, by the processor unit, second geometry, second attributes, and a number of connection points for the set of predefined components; and
identifying, by the processor unit, a number of connections of the set of created components to the number of connection points for the set of predefined components.

6. The method of claim 4, wherein the set of created components comprises a set of tubes and wherein an attribute in the attributes comprises a coefficient of resistance for each bend in the set of tubes.

7. The method of claim 6, wherein the step of identifying the attributes for the set of created components in the system and for the set of predefined components in the system comprises:
identifying, by the processor unit, the radius of bend for the outside diameter for the bend in the tube in the set of tubes; and
identifying, by the processor unit, the bend angle for the bend.

8. The method of claim 1 further comprising:
determining, by the processor unit, whether a number of needed attributes is absent from the attributes;
identifying, by the processor unit, the number of needed attributes in response to a determination that the number of needed attributes is absent from the attributes; and
wherein the step of generating the data using the attributes comprises:
generating, by the processor unit, the data using the attributes and the number of needed attributes, wherein the data is configured for use by the at least one of the finite element analysis application and the simulation application.

9. The method of claim 1, wherein the step of identifying the attributes for the components using the model and the repository having the performance information comprises:
identifying, by the processor unit, a set of components having performance information in the repository; and
obtaining, by the processor unit, an attribute for performance of a component in the components from the repository.

10. The method of claim 1, wherein the system is associated with one of a mobile platform, a stationary platform, a land-based structure, an aquatic-based structure, a space-based structure, an aircraft, a submarine, a bus, a personnel carrier, a tank, a train, a spacecraft, a space station, a satellite, a surface ship, a power plant, a van, a manufacturing facility, a city water system, and a building.

11. A method for analyzing a system, the method comprising:
connecting, using a processor unit, components to each other in an arrangement for the system;
retrieving, by the processor unit, attributes associated with each of the components, wherein the attributes include information about a performance of each of the components;
analyzing, by the processor unit, the performance of the components in the system using the attributes, the arrangement for the system, and at least one of a finite element analysis application and a simulation application, wherein the analyzing forms an analysis; and
adjusting, using the processor unit, the arrangement based on results of the analysis, wherein the results identify the performance of the components
determining, using the processor unit, whether a number of needed attributes is absent from the attributes; and
identifying, using the processor unit, the number of needed attributes in response to a determination that the number of needed attributes is absent from the attributes.

12. The method of claim 11, wherein the components are connected to each other in a graphical user environment and wherein the attributes are retrieved electronically.

13. The method of claim 11 further comprising:
generating the arrangement for the system and components in the components using a design application run by the processor unit; and
wherein:
a model comprises the arrangement for the system;
the model comprises the components in the system;
the components in the system are connected in the model; and
the performance of the each of the components comprises effects of the each of the components in the system being connected.

14. A computer program product comprising:

a non-transitory computer readable storage media;

first program code, stored on the non-transitory computer readable storage media, for identifying components in a system using a model for the system;

second program code, stored on the non-transitory computer readable storage media, for identifying attributes for the components using the model and a repository having performance information;

third program code, stored on the non-transitory computer readable storage media, for generating data using the attributes, wherein the data is configured for use by at least one of a finite element analysis application and a simulation application;

fourth program code, stored on the non-transitory computer readable media, for performing an analysis of the system using the data and the at least one of the finite element analysis application and the simulation application;

fifth program code, stored on the non-transitory computer readable media, for adjusting the model based on results of the analysis, wherein the results identify a performance of the components;

sixth program code, stored on the non-transitory computer readable storage media, for determining whether a number of needed attributes is absent from the attributes; and seventh program code, stored on the non-transitory computer readable storage media, for identifying the number of needed attributes in response to a determination that the number of needed attributes is absent from the attributes.

15. The computer program product of claim 14 further comprising:

sixth program code, stored on the non-transitory computer readable media, for generating the model and components in the components using a design application; and wherein:

the model comprises the components in the system, the components in the system are connected in the model, the performance information in the repository comprises effects of the components in the system being connected.

16. The computer program product of claim 14 further comprising:

sixth program code, stored on the non-transitory computer readable storage media, for generating the model for the system, wherein the model includes the attributes for the components in the system.

17. The computer program product of claim 14, wherein the first program code comprises program code for identifying a set of created components and a set of predefined components in the system, wherein the set of created components is designed or drawn using a computer aided design (CAD) application and wherein the set of predefined components comprises pre-existing components obtained from a source other than the computer aided design (CAD) application.

18. The computer program product of claim 17, wherein the second program code comprises program code for identifying first geometry and first attributes for the set of created components; identifying second geometry, second attributes, and a number of connection points for the set of predefined components; and identifying a number of connections of the set of created components to the number of connection points for the set of predefined components.

19. The computer program product of claim 14 wherein the third program code uses the attributes and the number of needed attributes to generate the data for use by the at least one of the finite element analysis application and the simulation application.

20. The computer program product of claim 14 further comprising:

sixth program code, stored on the non-transitory computer readable storage media, for performing calculations to identify a number of calculated attributes for the components using at least a portion of the attributes identified for the components and searching the repository for any performance information for the components using the at least a portion of the attributes.

\* \* \* \* \*